June 14, 1966 M. STAUNT 3,255,527
AIR DRIVEN DENTAL HANDPIECES
Filed Aug. 17, 1962 5 Sheets-Sheet 1
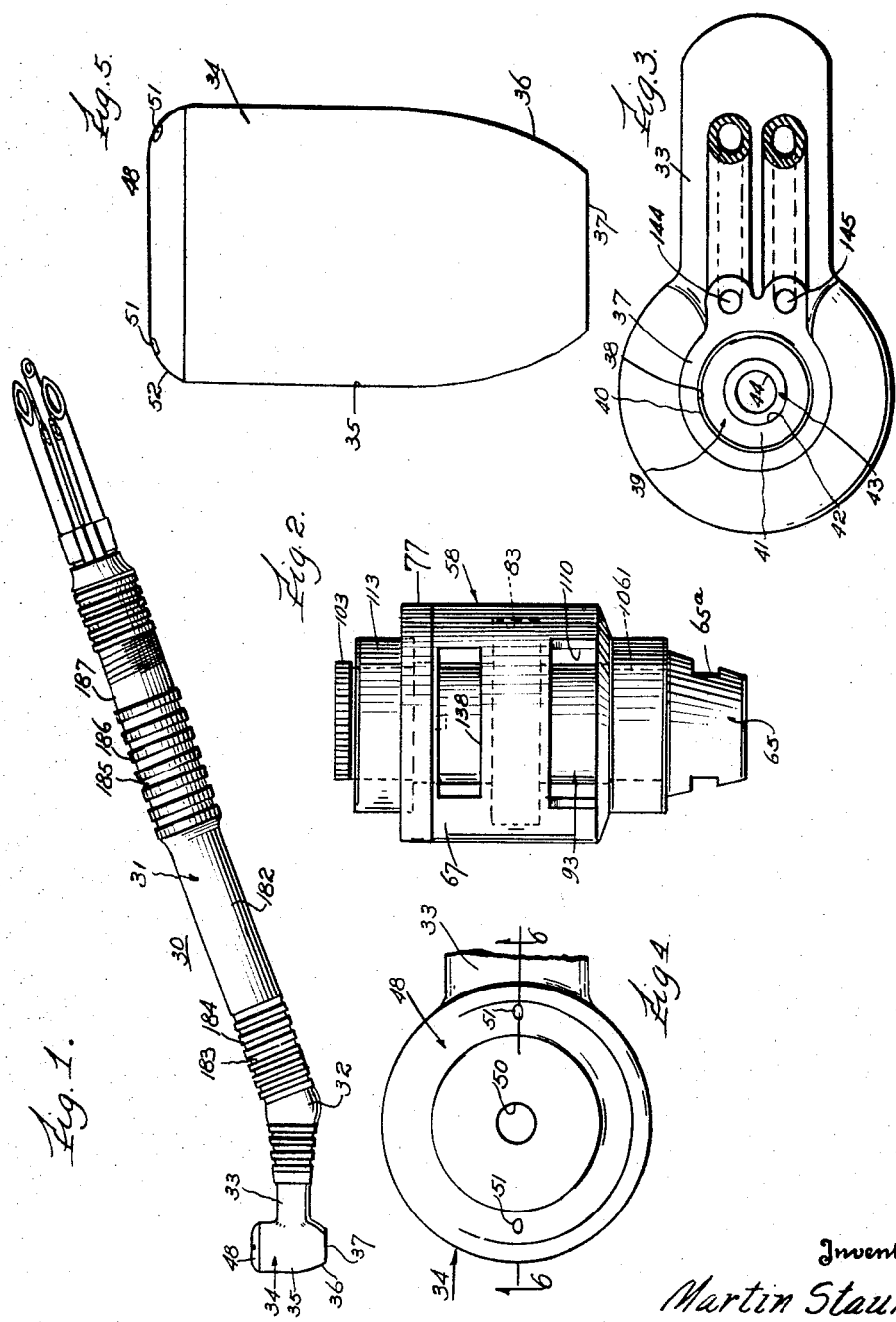
Inventor
Martin Staunt
By Robert F. Wendt
Attorney

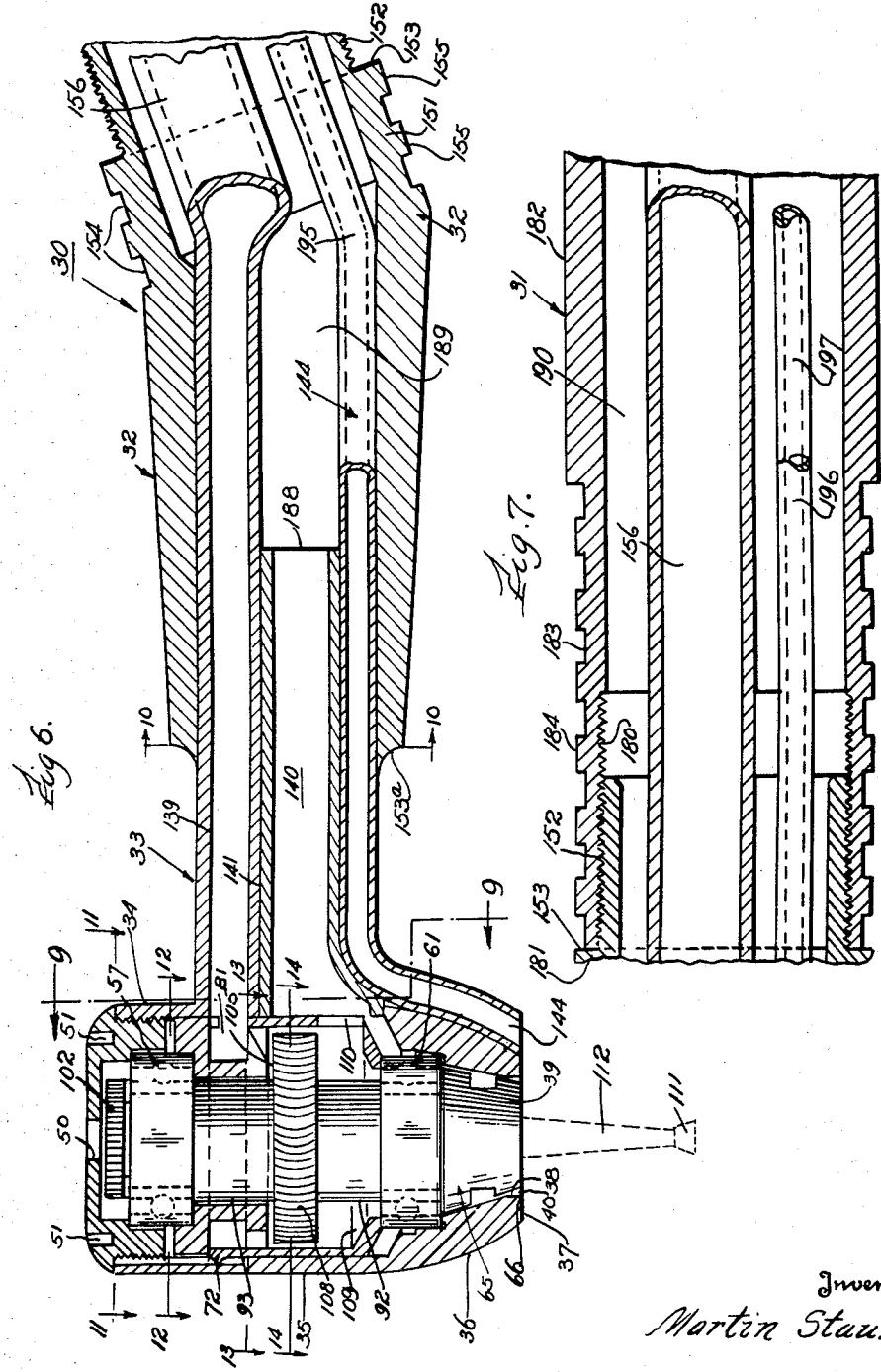

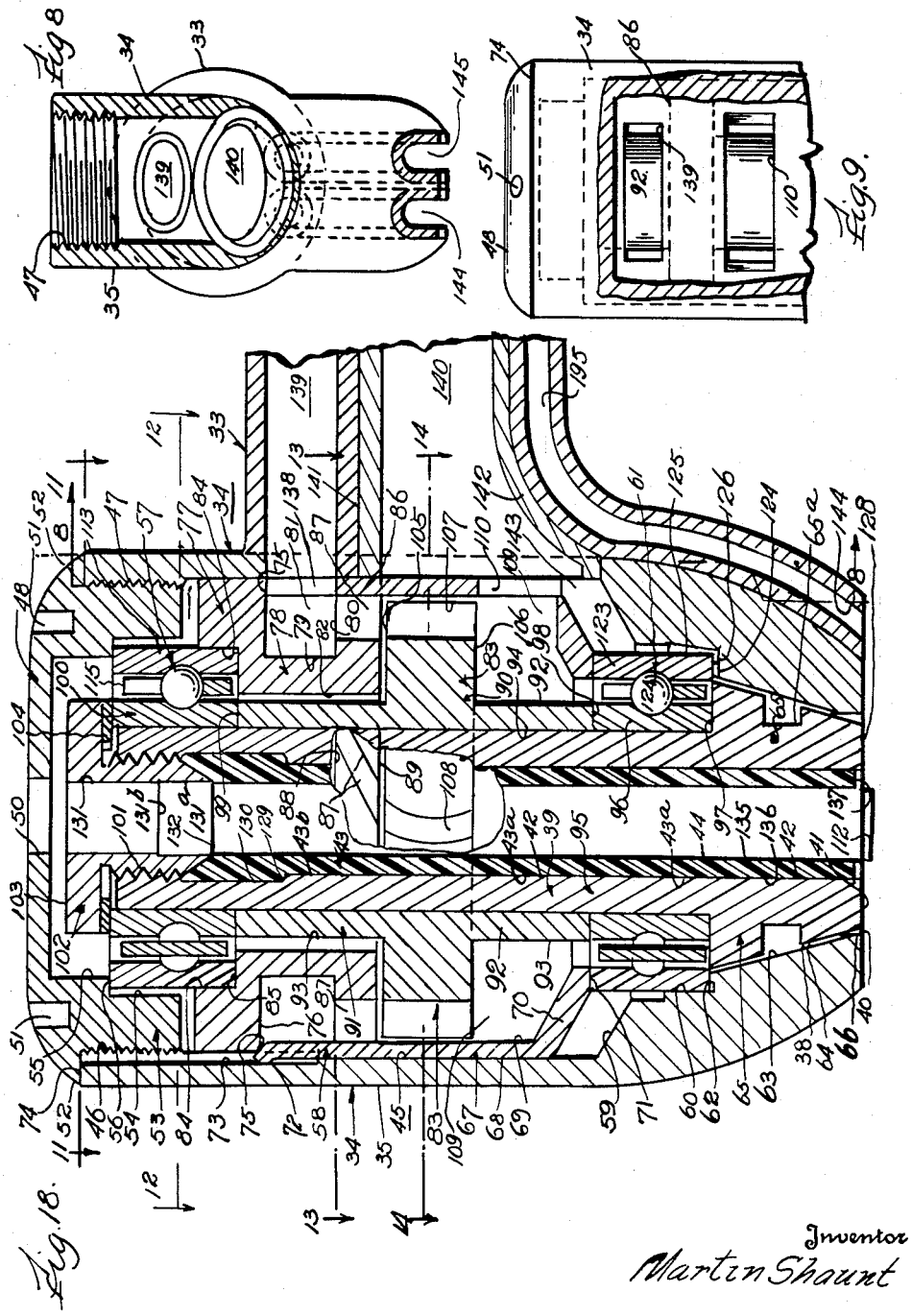

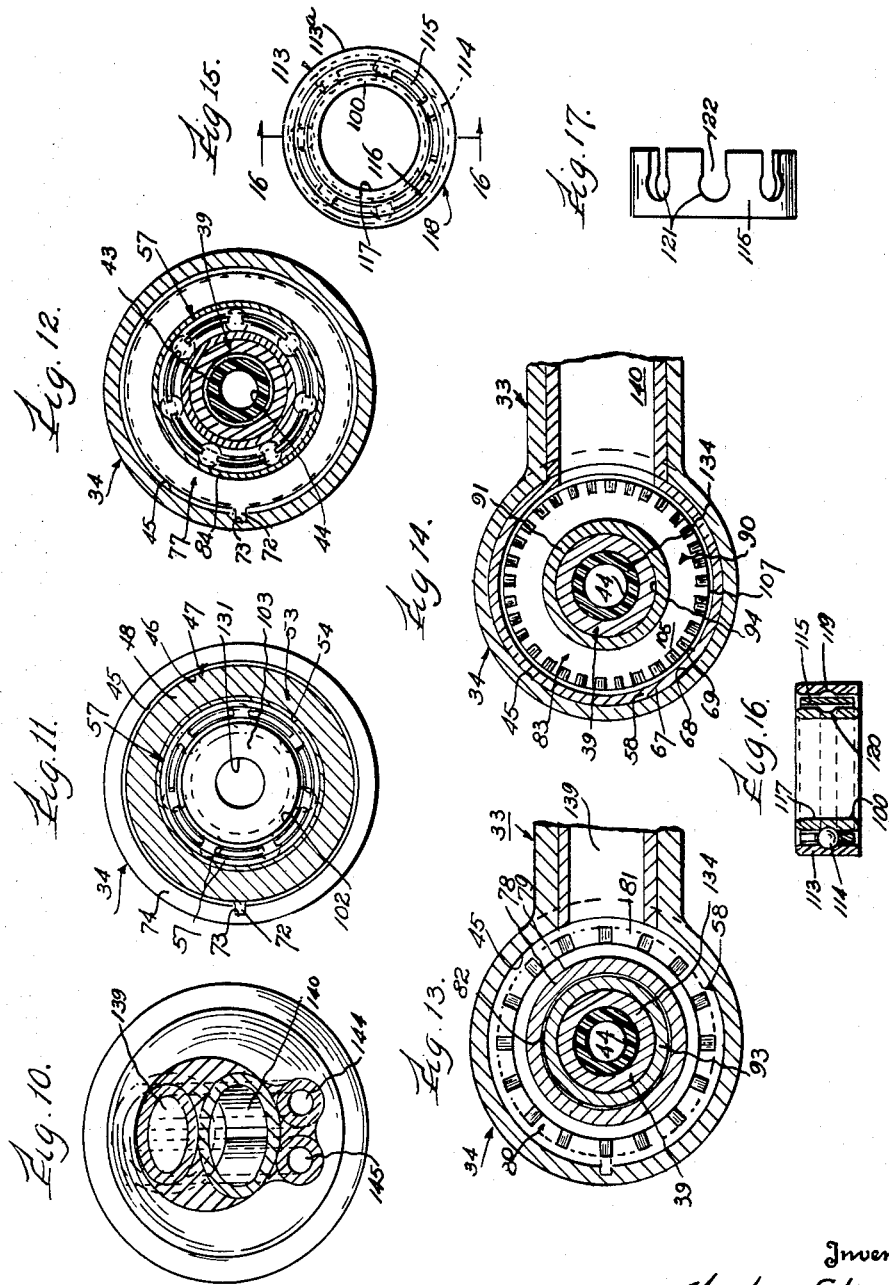

June 14, 1966  M. STAUNT  3,255,527
AIR DRIVEN DENTAL HANDPIECES
Filed Aug. 17, 1962  5 Sheets-Sheet 5
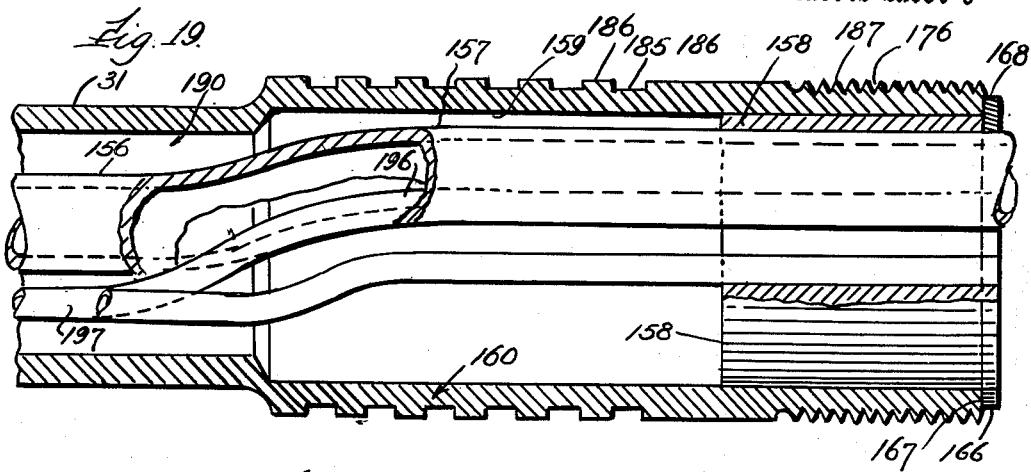
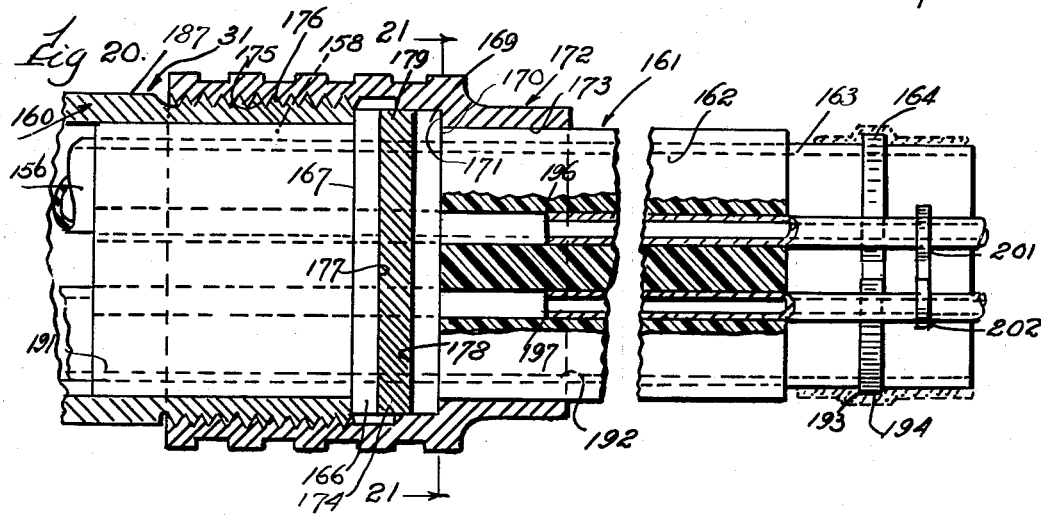
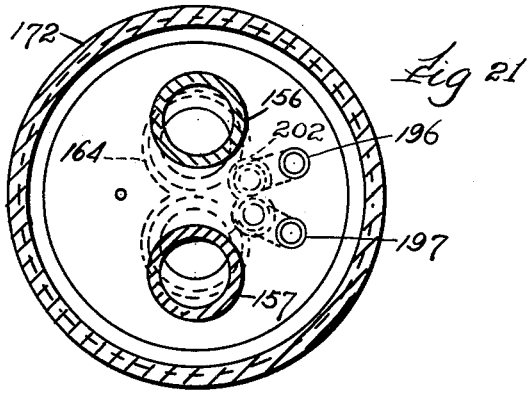
INVENTOR.
Martin Staunt
BY Robert H. Wendt.
Attorney.

3,255,527
AIR DRIVEN DENTAL HANDPIECES
Martin Staunt, Des Plaines, Ill., assignor, by mesne assignments, to American Hospital Supply Corporation, Evanston, Ill., a corporation of Illinois
Filed Aug. 17, 1962, Ser. No. 217,570
4 Claims. (Cl. 32—27)

The present application is a continuation-in-part of my prior application of the same title, Serial No. 789,751, filed January 28, 1959, now Patent No. 3,084,439.

The present invention relates to air driven dental handpieces, and is particularly concerned with the provision of an improved contra angle handpiece adapted to be driven by air for the purpose of drilling, milling, grinding, or treating restorative cavities in carious teeth to prepare them for fillings, crowns, bridges, inlays, or other restorative measures.

I desire it to be understood that the air driven turbine, which forms the power source of my contra angle handpiece, is of general application and may be used for various purposes in the arts; and the handpiece itself may be employed for grinding, milling, engraving, polishing, die sinking, and many other operations of a similar nature.

One of the primary objects of the invention is the provision of an improved device of the class decribed which operates at a high speed, such as thousands of revolutions per minute, for the purpose of expediting the grinding operations, but with a minimum amount of noise and vibration, since the reduction of vibration and the reduction of the noise level is of the greatest importance to both the patient and the operator in the employment of such a tool for dental operations.

Another object of the invention is the provision of an improved air driven turbine which produces a maximum torque at the driving spindle with the use of a minimum amount of air, and which operates at high rotary speeds, such as between 200,000 r.p.m. to 350,000 r.p.m. and over smoothly and with a minimum vibration and more quiet operation than any of the devices of the prior art.

Another object of the invention is the provision of an improved dental handpiece assembly which is adapted to be used with tungsten carbide or diamond burs at high speeds to produce effective cutting in a minimum time and to reduce the heat at the cutting surface and in the bearings of a handpiece to a comfortable level for the purpose of providing less trauma and greater comfort to the patient and lessening the strain and tension of the operator.

Another object of the invention is the provision of an improved air driven dental handpiece in which the air is employed not only for driving the air turbine, but for cooling the parts of the mechanism and for lubricating the bearings and cooling the bur, at which point the cooling of the air is supplemented by a combined air and water spray directed toward the bur and into the cavity, the control of the cooling medium being automatic and simultaneously applied with the operation of the handpiece.

Another object of the invention is the provision of an improved construction of an air driven dental handpiece which is adapted to be lubricated effectively at speeds over 200,000 r.p.m. and so constructed that dirt and grindings are excluded and driven out of the housing containing the ball bearings and other moving parts by employing a combined air and lubricant mist, with a minimum amount of the lubricant reaching the interior of the mouth, where it might be breathed, and practically all of the exhaust air being carried back through suitable conduits to a point away from the patient and the operator.

Another object of the invention is the provision of an improved air driven dental handpiece in which the air path through the turbine is reduced in length to a minimum and graduated in size, increasing in volume as it progresses, and smoothly directed with minimum turbulence to an enlarged outlet for the purpose of reducing the sound level, increasing the torque, and reducing the volume and pressure of air required.

Another object of the invention is the provision of an improved air driven contra angle handpiece so constructed that it is adapted to be used with a supply of air under pressure and a supply of water under pressure, both of which are controlled by the operator so that a dental bur cutting at a high speed is automatically cooled by a jet of water combined with atomizing air directed toward the point of cutting, and the cutting may be stopped without removing the handpiece from the mouth, and air at room temperature or elevated temperature momentarily directed into the cavity to blow out the chips and cuttings and dry the cavity while it is still being inspected, after which the cutting may continue, if necessary, and brought to completion with repeated periods of cutting and clean-out, without ever removing the handpiece from the mouth of the patient to reach for the hot air syringe, as is done with devices of the prior art.

Other objects and advantages of the invention will be apparent from the following description and the accompanying drawings, in which similar characters indicate similar parts throughout the several views.

Referring to the drawings, in which there are eight sheets,

FIG. 1 is a fragmentary side elevational view of an air driven contra angle handpiece, full size, embodying the invention;

FIG. 2 is an enlarged side elevational view of the removable turbine unit;

FIG. 3 is an enlarged fragmentary bottom plan view of the head of the handpiece on a scale of six to one;

FIG. 4 is a fragmentary top plan view of the handpiece head;

FIG. 5 is a similar end elevational view of the handpiece head;

FIG. 6 is a fragmentary sectional view of the handpiece head and its supporting neck and elbow, taken on the plane of the line 6—6 of FIG. 4, looking in the direction of the arrows;

FIG. 7 is a fragmentary sectional view showing a continuation extending from the right end of FIG. 6, being the lower end of the handle of the handpiece;

FIG. 8 is a fragmentary sectional view, taken on the plane of the line 8—8 of FIG. 18, looking in the direction of the arrows, and showing the ends of the inlet and outlet conduits in the neck of the handpiece;

FIG. 9 is a fragmentary sectional view, taken on the plane of the line 9—9 of FIG. 6, looking in the direction of the arrows, and showing the shape of the inlet and outlet conduits in the spacer shell of the turbine unit.

FIG. 10 is a fragmentary sectional view, taken on the plane of the line 10—10 of FIG. 6, looking in the direction of the arrows;

FIG. 11 is a sectional view, taken on the plane of the line 11—11 of FIG. 6, looking in the direction of the arrows, with the top cap removed;

FIG. 12 is a sectional view taken on the plane of the line 12—12 of FIG. 6, looking in the direction of the arrows;

FIG. 13 is a fragmentary sectional view, taken on the plane of the line 13—13 of FIG. 6, showing the stator slots in plan;

FIG. 14 is a fragmentary sectional view, taken on the plane of the line 14—14 of FIG. 6, showing the upper ends of the rotor slots;

FIG. 15 is an end elevational view of one of the ball bearing assemblies;

FIG. 16 is a sectional view, taken on the plane of the line 16—16 of FIG. 15, looking in the direction of the arrows;

FIG. 17 is a side elevational view of one of the nylon ball retainers;

FIG. 18 is an enlarged fragmentary sectional view taken on the same plane as FIG. 6, with the parts of the turbine in section;

FIG. 19 is a fragmentary side elevation of the right end of the handpiece of FIG. 1, with the air and water hoses disconnected in partial section;

FIG. 20 is a fragmentary side elevation of the hose connections for air and water in partial section exposing the hose ends;

FIG. 21 is a sectional view taken on the plane of the line 21—21 of FIG. 20.

Referring to FIGS. 1-6, the air driven handpiece 30 embodying the invention is shown full size in FIG. 1.

It preferably comprises a handle tube 31 carrying an elbow fitting 32 at its lower end, which supports the neck tube 33 at an obtuse angle to the handle 31; and the neck tube 33 carries a handpiece head 34, comprising a housing member made of brass, nickel-chrome plated (FIG. 1); and the head 34 may be substantially cylindrically shaped, having a cylindrical wall 35, which is rounded and tapered at its lower portion 36 to remove as much as possible of that portion of the housing which might obscure the view of the end of a dental bur mounted in the head 34.

The lower end of the head 34 has a generally plane surface 37, which is provided with a central circular aperture 38 that is slightly spaced from the circular end 39 of a rotating bur shaft, leaving an annular clearance 40 serving as an annular air escape and air spray nozzle for air issuing from the housing of the handpiece.

It is this escaping air which is so restricted at the annular nozzle 40 that it maintains an air pressure inside the handpiece housing and excludes the ingress of dirt and grindings by the outward flow of air from the handpiece housing under operation.

The end of the bur shaft or spindle 39 is shown at 41; and the bur shaft has a cylindrical bore 42 which contains a plastic bur tube 43, having a cylindrical bore 44 for frictionally gripping the cylindrical portion of the shank of a bur or other tool to be driven by the handpiece, as shown in FIG. 6. The cap 48 is preferably of stainless steel.

The head 34 is open at its upper end, being provided with a cylindrical bore 45 (FIG. 18) having an internally threaded counterbore 46 at its upper end for receiving the externally threaded portion 47 of a top cap 48, which closes the upper end 74 of the housing, except for the central aperture 50 in the cap that is used for inserting a tool employed in pushing out the shank of a dental bur when it is to be removed.

The cap 48 has a pair of diametrically opposite circular sockets 51 for receiving the lugs of a spanner wrench used in tightening the cap. The cap is rounded at its outer edge portion 52 and may be threaded so far into the head 34 that its edge merges with the top of the head, forming a smoothly rounded upper corner without projections that might injure the mouth.

At its lower side the cap 48 has the plug formation 53, which is provided with a bore 54, large enough to receive the upper outer race of the ball bearing assembly; and the plug is formed with a smaller counterbore 55 for receiving the upper end of the spindle and its associated parts, with a clearance so that the spindle may rotate without contacting the cover.

The plug formation 53 has an annular shoulder 56 for engaging the outer race of the upper ball bearing assembly 57 to secure the removable turbine unit 58 in the head 34.

The head 34 has a frusto-conical inner surface 59 toward its lower end and a reduced counterbore 60 for receiving the outer race of the lower ball bearing assembly 61 against an annular shoulder 62. From the annular shoulder 62 the interior of the head 34 has a frusto-conical inner surface 63, providing a clearance with respect to an external frusto-conical surface 64 on an enlargement 65 of the bur shaft 39, thereby forming the annular nozzle clearance 40, which is slightly enlarged at its lower end by forming a flaring crack 66 of annular shape.

This annular crack or nozzle permits air to escape from the interior of the head housing 34, but maintains sufficient resistance to its escape to provide a pressure inside the housing, to exclude dirt and grindings from the housing.

The air turbine constitutes a removable unit 58 because all of its parts are carried by a cylindrical stainless steel shell 67. This shell 67 has an outer cylindrical surface 68 and an inner cylindrical bore 69.

At its lower end it has an inwardly extending frusto-conical flange 70, terminating in an annular end surface 71 that engages the outer race of the lower ball bearing assembly 61 to secure it in the head 34.

The shell 67 fits in the bore 45 of the head 34 and is secured against rotation therein by an outwardly turned tab or lug 72 pressed out of its upper edge to extend into a rectangular groove 73, which extends upwardly across the threads 46, and is open at the top end 74 so that the turbine unit may be slid downward into the bore 45 when the lug 72 registers with the groove 73; but thereafter it cannot rotate.

The upper end of the shell 67 is indicated at 75, presenting an annular surface which engages the lower surface 76, of the upper enlargement 77 of the stator 78. The stator 78 comprises a cylindrical body or enlargement 77 integrally joined to a central tubular portion 79 and a lower cylindrical body 80, which forms a floor or lower wall of an annular rectangular groove 81, serving as a stator air manifold.

The tubular portion 79 of the stator 78 has a central through bore 82, clearing the parts of the rotor 83, and there is a cylindrical counterbore 84 in the top of the stator, terminating at an annular shoulder 85 engaging the lower edge of the outer race of the upper ball bearing assembly 57, which is located in counterbore 81.

The stator enlargement 77 closes the upper end of the stator manifold 81 by engaging the shell 67; and the lower floor 80 of the stator engages in the shell bore 69 with its outer cylindrical surface 86 and closes the lower side of the air manifold 81, except that the floor 80 of the stator has a multiplicity of nozzle slots 87, which form nozzle apertures in combination with the inner surface 69 of the shell 67.

The slots 87 in the stator floor are at an acute angle to the upper and lower stator surfaces 88, 89 so that the air issuing from the surface 89 of the stator may have an axial component to move the air out of the stator and into the rotor; but the major component is in a peripheral direction and in the direction of rotation of the rotor.

The angularity may vary; and I have found that an angle of 60 degrees to the axis of the turbine produces a driving torque which is stronger than the devices of the prior art and that performance is improved at an angle of 65 degrees.

The slots 87 in the stator are made by means of a milling cutter; and while a suitable torque has been produced by using slots fifteen-thousandths of an inch in width, I prefer to employ slots ten-thousandths of an inch in width, this being the width of the milling center, for the reason that this reduces air consumption and still provides excellent torque.

This results in slots which are parallel walled and substantially rectangular and complementary in shape to the cutter. A multiplicity of such slots is provided, such as eight slots in the stator of this size, with thirty-two slots in the rotor. This also reduces the possibility of the existence of a dead center, as each air nozzle is directed toward four slots in the rotor.

The rotor 83 comprises a substantially cylindrical metal body preferably made of brass, like the stator and shell; and the body 90 is integrally joined to a pair of tubular extensions 91, 92 having cylindrical outer surfaces 93 and a cylindrical bore 94.

The cylindrical bore 94 is adapted to receive the tubular body 95 of a bur shaft 39, preferably of stainless steel, which has the frusto-conical enlargement 65 at its lower end. The cylindrical part 95 of the bur shaft may support the inner race 96 of the ball bearing assembly 61 against the annular shoulder 97; and this race is in turn engaged by the end surface 98 of the tube 92. The races and balls are preferably made of stainless steel.

The tube 92 and the rotor 83 and upper tube 93 are mounted on the bur tube; and the upper end 99 of the rotor tube 93 engages the bottom of the upper ball bearing race 100. The bur tube 93 is provided at its upper end with inner threads 101 and with a screw plug 102 threaded into the threaded bore. The screw plug has a laterally extending or radial flange 103, the bottom of which may engage a metal washer 104, which engages the upper race 100. Thus the inner races and the rotor are secured on the bur shaft, on which they may also have a close fit. The threads on the screw plug 102 are left hand to prevent the plug from being loosened by right hand rotation of the bur shaft 39.

The cylindrical rotor body 90 has an upper plane surface 105 and a lower plane surface 106, which are spaced farther from each other than the thickness of the stator floor.

The rotor body 93 has a cylindrical outer surface 107, which has a close clearance with respect to the inner surface 69 of the shell, but permits the rotor to rotate freely without contact. The rotor is preferably provided with four times as many slots in its periphery as there are slots in the stator; and the rotor slots are cut by means of a tubular milling cutter, which has a sufficiently large diameter and is used on a rotor of smaller diameter so that one edge of the tubular cutter may cut a curved slot like that indicated at 108 in the rotor 83, there being 32 such slots, for example, in a rotor which produces a high torque.

The curvature of the slots 108 relative to the upper and lower surfaces of the rotor depends on the location of the tubular cutter, which in FIG. 6 had its axis located midway between the upper and lower surfaces of the rotor. This makes the curvature a circular arc symmetrically located across the rotor.

By employing stator jets only one-fourth in number to the number of the rotor slots a more smooth rotating torque is impressed on the rotor; and by employing the specific construction shown, the air passing through the stator and rotor takes the shortest possible path, with a minimum amount of turbulence and a maximum amount of torque.

The air is discharged into a lower expansion chamber 109, from which the air is exhausted out of the turbine at a lateral exhaust port 110. The air is also used to pass through the lower ball bearing assembly 61 at the spaces between the balls; and the air issues through the conical slot 66 and is discharged in a conical spray toward the cutting end 111 of the bur 112 due to the flare 66, which exists at the lower end of the slot 40.

The clearance between the upper surface 105 on the rotor and the lower surface of the stator floor is quite close, in the nature of seven-thousandths of an inch; but the rotor and its bearing parts have a limited axial freedom due to a certain looseness of the balls in the ball bearing races.

The structure of the ball bearings employed in the turbine is of the utmost importance and they are preferably constructed substantially as shown in my prior application, now Patent No. 2,911,268, Ser. No. 752,447, on Ball Bearing Assemblies and Methods of Making Them, filed August 1, 1958; and the disclosure of that application is hereby incorporated herein by reference thereto.

Each of the ball bearing assemblies 57 and 61 includes the following parts. The bearing assembly 57 includes the inner race 100, outer race 113, balls 114, and ball retainer 115. The races and balls are preferably made of hardened stainless steel, but carbon steel balls may also be used.

The outer race 113 has cylindrical outer surface 113 and inner cylindrical surface 116 (FIG. 16). The inner race 100 has the inner cylindrical surface 117 and the outer cylindrical surface 118. The ends or edges of both races are plane; but the corners are preferably chamfered.

The outer race 113 has a ball groove 119 of partially circular cross section on its inside formed on a radius larger than the radius of the ball 114; and the inner race 100 has an outer groove 120 registering with the groove 119 and formed on a radius which is larger than the radius of the balls 114.

The ball grooves 119 and 120 are uniform in cross section and extend all the way around the inside and outside, respectively, of the outer and inner races; and there are no filling grooves.

The grooves are not filled with a full complement of balls 114, but only include a lesser number, so few that when all the balls are arranged on one side, there is a sufficient crack between the inner race and the outer race to insert or remove balls edgewise into or out of the crack until they reach the groove.

For example, the present bearings include seven balls, which are equally spaced in the grooves by the ball retainer 115. The ball retainer comprises a plastic member of lubricating characteristics, such as nylon or some polyethylene compound; and the ball retainer is made out of a short length of nylon tubing, which forms a closed annulus of such size that it may be received between the inner race and the outer race with a clearance with respect to both of them.

The retainer 115 has seven ball sockets 121, comprising circular bores, the diameter of which may be 0.043 when balls are employed having a diameter of 0.0394". The inner diameter of the inner races 100 may be 0.0125" or 0.0135", depending on the shaft diameter.

The outer diameter of the outer race may be ¼". The length of the races may be 3/32"; and the ball retainer may be 0.081 in width.

The ball retainer 115 is provided for each ball bore 121 with a longitudinally extending slot 122; and this slot is of smaller size than the diameter of the balls. For balls having a diameter of 0.0394" the slots may be 0.035", or 4/1000 narrower than the balls.

This permits the balls to be pressed into the slots or the slots to be pressed over the balls by exerting a predetermined force. The balls snap into the bores 121, where they are retained by the restricted slots.

The dimensions given in this specification are merely by way of example, and may be varied in devices of different sizes.

The balls being held in the assembly by engagement with the grooves, and the balls being spaced by the retainer, the balls hold the retainer in the position of FIG. 16, where it floats.

The clearance between the outside of the retainer and the outer race is less than the clearance between the inside of the retainer and the inner race for the purpose of making sure that there is no drag between the retainer and the inner race, which rotates rapidly.

For example, the clearance between the inner race and the inside of the ball retainer may be 0.006" and the clearance on the outside of the ball retainer with respect to the outer race may be 0.0035".

When the rotor rotates, the inner race 100 necessarily rotates with it; and the balls roll in the groove 120; but they rotate in the opposite rotative direction. It is believed that the balls are thrown out by centrifugal force, engaging in the groove 119 of the outer race, where they may have less slippage than they have with respect to the inner race.

The nylon retainer floats between the races, engaging neither of them; but it rotates and moves with the balls.

It is believed that the air, entraining a mist of lubricant, which is forced through the bearings, serves to keep the ball retainers concentrically located; and lubricant is deposited on the retainer and races and the balls, which are constantly lubricated thereby.

The structure of the lower bearing assembly 61 is the same; and the inner race is indicated at 96, the outer race 123, and the balls 124.

The air driving the turbine, containing lubricant mist, leaks along the clearances between the rotor 83 and the stator 78 to the upper bearing assembly 57, and may escape through the hole 50. When the air reaches the aperture 50, the amount of lubricant passing has already been reduced to a minimum, being deposited as drops in the bearings.

The lower bearing assembly 61 is exposed to air from the expansion space 109, carrying lubricant mist; and this air is passed through the bearings to the annular slot between the outer frusto-conical surface 64 and the inner frusto-conical surface 63, lubricating the bearing 61 during its passage.

I have found that it is desirable to increase the amount of air escaping from the annular clearance 40 about the bur shaft head 65, as follows. The bore 60, forming a socket for the outer race 123, has its wall provided with a channel, which may be 1/32" wide, extending down the cylindrical inner wall 60 at 125. This channel communicates with groove 126 located in the base of bore 60 in the annular shoulder 62, and provides additional leakage of drive air past the ball bearing 61 to the conical nozzle 40.

This increases the air issuing from the nozzle clearance 40 in a conical air stream about the bur shaft 112 and converging on the bur 111 to increase the cooling effect.

The bur shaft 39 comprises a stainless steel tube having a cylindrical bore 127 and a plane end 128, and terminating in the threaded counterbore 101 at the top.

The bur shaft has an annular shoulder at 129 and a slightly larger counterbore 130 extending upward from said shoulder, where the bore is enlarged by several thousandths to form the annular shoulder 129.

The bur shaft has a pair of parallel flats 65a on its enlarged head for grip by a wrench.

The hollow threaded plug 102 of stainless steel has a through aperture 131, which terminates in a sharp edge and a beveled end surface 133 engaging the end of the plastic tube 134, which is preferably made of Teflon. The plastic tube 134 has an inner cylindrical bore 135 and an outer cylindrical surface 136, the outer diameter of which is initially uniform throughout its length, except that a short portion at the lower end is a few thousandths greater outer diameter.

The purpose of making the lower end slightly larger is to compress the plastic sleeve into the bur tube 39 at its lower end, while a mandrel is inserted in the bore 135, so that the Teflon is under greater compression at that point, where there is a maximum lateral pressure exerted on the bur shank.

At its upper end the plastic tube 134 is also initially of the same uniform outer diameter throughout, but as the plastic tube 134 is forced into the bore of the shaft with a mandrel having an annular shoulder engaging the end 137, the upper end engages the beveled end 131a of the plug 102; and the Teflon is forced outward and expanded into the counterbore 130 anchored against the annular shoulder 129 for retaining the plastic tube in the bur shaft.

The plastic tube is adapted to grip the cylindrical portions of shanks of burs and other tools, even though they have flats or slots or other formations beneath their cylindrical surfaces for locking the shank in, in other types of handpieces.

The features of such a plastic bur tube as a chuck for holding a bur shank and other tools are covered by a separate patent on chucks for air driven dental handpieces, Patent No. 2,983,519, issued May 9, 1961, the disclosure of which application is hereby incorporated herein by reference thereto.

The inlet port for the air turbine unit comprises a rectangular aperture 138 in the curved cylindrical wall of the shell 67, as shown in FIG. 2; and the outlet port for the turbine is indicated at 110 (FIG. 6) in shell 67.

The head housing 34 is integrally brazed to a substantially cylindrical neck tube 33, which is formed by brazing together two tubes, one small and the other larger, indicated at 139 and 140 these tubes being initially round, but deformed into substantially D cross section at their left end in FIG. 6, where the flat sides are brazed together at 141.

The ends of these D shaped tubes at the left are curved to fit against the cylindrical side wall of the shell 67 at the inlet 138 and the outlet 110; and the lower tube 140 is flared downward at 142 to meet an aperture 143 below the conical end 70 of the shell.

The two D tubes, when brazed together, form a finished cylindrical neck 33, except that they have also secured to the lower side of the tube 140 a pair of water and air tubes 196 and 197. These two tiny tubes extend along below the neck 33; and each is curved downwardly and brazed to the rounded portion 36 of the head housing 34 at 146.

The two tiny tubes 196, 197 for water and air terminate in beveled ends flush with the end 37 of the head housing, as shown in FIG. 1, forming water and air nozzles 144, 145, pointing toward the cutting bur 111.

The air issuing from the annular nozzle sucks in the water issuing from the water nozzle 144, passing so that the water is caused to rotate and is atomized into a blunt conical point at the bur 111, cooling the bur and the cavity by the application of cool water and air.

The control of the supply of air to the turbine is such that both driving air and water are turned on simultaneously and off simultaneously so that the grinding end of the bur and the tooth are always cooled when a bur is running.

When the water and air-lubricant supply are turned off, without removing the handpiece head from the mouth or changing the direction of his gaze or the position of patient or dentist, the operator may turn on the air supply, causing air to issue from nozzle 145 of the air tube 197, which is supplied with filtered and dried air from a source further to be described, for blowing out the chips and grindings and drying the cavity, after which the grinding may be continued.

This continuous facility for grinding, inspection, and blowing away chips saves a great deal of time, as the patient is apt to change his position or close his mouth when the dentist removes a handpiece according to the prior art and reaches for a hot air syringe to blow out the chips and dry the cavity.

The alternate grinding and cavity cleaning with the present handpiece actually takes less time than was spent for cutting the cavity in the devices of the prior art.

Referring to FIG. 6, the composite assembly of the two D tubes 139, 140, and the two tiny water and air tubes 144, 145, all brazed together, extend into a knee joint, 32, comprising a tapered tubular member having an obtuse angular bend, and is provided with the angularly extending short end portion 151, having a reduced threaded end 152 and an annular shoulder 153.

At the point of entry of the neck 33 into the elbow 32 the juncture is provided with a fillet 153a and smoothed and rounded; and the elbow is provided with grooves 154 and knurled lands 155 at both of its ends for convenient grip by the operator.

The upper D tube 139 extends into the elbow and is spread into a cylindrical tube 156 just before it emerges from the elbow, and extends up into the handle 31 (FIG. 7) through which it continues, as shown in FIG. 18, with an offset. This tube 139 and its extension 156, 157, constitutes the air-lubricant mist supply for driving and lubricating the turbine and for cooling its bearings and siding in the cooling of the rotating bur.

The tube extends to a cylindrical brass plug 158, which is slidably mounted in a cylindrical bore 159 in the enlarged end portion 160 of the handle 31, where the tube projects into a similar brass cylindrical plug 161, having a bore 162 for receiving the end of the tube 156 with a tight fit, and communicating with a longitudinally projecting ferrule 163, having a rib 164 for retaining a plastic hose 165.

The plug 158 has a radially projecting flange 166, presenting an annular shoulder 167 engaging the end 168 of the handle tube 31; and the plug 161 has a radially extending flange 169, having an annular shoulder 170 engaged by annular shoulder 171 in a gland fitting 172.

The gland fitting has a cylindrical bore 173 sliding on the plug 161 and an enlarged bore 174 receiving the flange 169 and a threaded counterbore 175 threaded on the threaded portion 176 on the end of the handle tube 31.

The two plugs present registering apertures to each other for pressure air and lubricant mist, exhaust air, water, and dry air, and are provided with the opposed flat surfaces 177, 178, between which a resilient washer 179 of duprene or neoprene may be compressed, and provided with registering apertures for passing the tubes and providing communication between the registering conduits.

A handle tube 31 comprises a substantially cylindrical stainless steel tube having internal threads 180 (FIG. 7) at its lower end, where the annular end 181 engages the threads 152 and annular shoulder 153 on the knee joint 32.

The handle 31 may have a smooth cylindrical portion 182 between the end portions, which have grooves 183 and knurled lands 184 at the lower end, and an enlarged portion with grooves 185 and knurled lands 186 at the upper end, terminating in the smooth cylindrical upper end 187 threaded at 176.

The knurled lands and grooves are for the purpose of providing a non-slipping grip in the hand of the operator.

The larger D tube 140 (FIG. 6) extends into the elbow 32; and thereafter exhaust air from the turbine issues from its end 188 into the bore 189 of the elbow, which provides an enlarged path for the expanded exhaust air leading to the bore 190 in the handle 31.

This exhaust air bore terminates at the plug 158, which has a through bore 191 for passing exhaust air and communicating through a hole in the gasket 179 with a through bore 192 in the plug 161, leading to a ribbed tube 193, having ribs 194 for retaining the plastic hose carrying exhaust air away from the handpiece.

The water tube 196 extends into the elbow 32 beside the air tube 197, all of these being brazed together; and both these small tubes 196, 197, are bent obtusely at 195 in the elbow; and each has an integral extension, comprising a separate stainless steel tube 196, 197, extending through the handle and through complementary apertures in the plug 158.

The air supply tube 156 for the supply of air and lubricant mist and the two tiny dry air and water tubes 196, 197, project axially from the plug 191 to be inserted into the plug 161 through the gasket 179; and for convenience in handling these three tubes at the gland 172 the projections of the tube are of unequal length.

The plug 158 passes the exhaust air through conduits 191 and 192 to the ferrule 193, supporting a plastic hose. The plug 161 also supports a pair of tiny tubes 201, 202, which carry plastic tubes of equivalent size; and all the plastic tubes issuing from the plug 161 are preferably cemented together.

The current supplied to the heaters 196 and 197 is preferably of low voltage, being reduced to a low voltage in a voltage transformer, the primary of which is connected to a 110 volt A.C. line.

Referring to FIG. 21, this view shows the plug 158, with drive air tube 156, exhaust air tube 157, air tube 197, and water tube 196.

Operation

The operation of the parts of the handpiece has been described in connection with the features of their construction; but the advantages and over-all operation may be summarized as follows:

The present handpiece may be operated at speeds up to 320,000 r.p.m. with 30 pounds per square inch pressure, the shaft running free; but it is preferably not operated at pressures over 20 pounds per square inch; and as the speed varies with the air pressure, the speed may be varied by adjusting the air pressure from zero to 20 pounds. At 20 pounds per square inch the speed may vary from 160,000 r.p.m. to 180,000 r.p.m.; and at these speeds tungsten carbide and diamond burs should be employed.

The present handpiece has a greatly increased torque over the air driven handpieces of the prior art and may be operated without stalling, such as occurs with the devices of the prior art, due to their lack of sufficient torque.

Due to the high speed at which the handpiece operates, it is necessary to cool both the bur and the tooth; and cooling is assured with the present handpiece by having the water supply nozzle on the handpiece turned on simultaneously with the drive air and by having a part of the drive air issue from a conical nozzle surrounding the shaft and converging the cooling air with atomized water on the bur and into the cavity on all sides.

While the air has been referred to as cooling air and the water as cooling water, they may actually be heated to a comfortable temperature by the heaters in the handpiece; and the dry air may also be heated in the handpiece by pre-heating the air in the control unit.

A very important feature of the invention is the drive of the turbine with air under pressure containing lubricant mist, which passes out of the handpiece head through the ball bearings at the top and the bottom of the shaft, depositing lubricant on the races, balls, and ball retainers, and constantly supplying lubricant whenever the handpiece is operated, so that adequate lubrication is assured.

The present handpiece will operate more quietly and with less vibration than the devices of the prior art; and this becomes very important as the speed of operation is increased, which tends to increase the vibration and noise level.

The exhaust air is carried away from the handpiece and away from the immediate vicinity of the patient and dentist to the control unit, where any remaining oil mist is filtered out and deposited.

The present handpiece has a more uniform torque distributed uniformly about the periphery of the rotor, due to the application of air to all sides of the rotor; and the dental bur or cutter will produce less chatter and make the cut surface more smooth and true than in the devices of the prior art.

The construction of the ball bearings described is a very important feature of the handpiece; and the simple structure of the plastic bur tube acting as a chuck is another important feature, all contributing to the smooth operation, high speed, reduction of sound, and reduction of vibration of the assembly.

The plastic ball retainer permits proper radial and axial movement of the parts; and the end play in the ball bearings may permit an end play movement of the bur of one-thousandth of an inch.

The path of the air through the stator and rotor of the turbine is short and involves a minimum number of turns, thereby reducing turbulence in the air stream as it passes through the turbine, which results in a reduction in noise over the devices of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An air driven dental handpiece assembly, comprising a cylindrical shell having a cylindrical bore, open at both ends, and having a lateral inlet port and a lateral outlet port spaced axially from each other, a cylindrical stator fitting in said shell bore, and comprising a pair of cylindrical annular flanges separated by a peripheral groove communicating with said inlet port and forming an air manifold, one of said flanges closing off air from one end of said shell, and the other of said flanges having a plurality of diagonal open slots cut in its periphery and forming air nozzles receiving air from said air manifold, said slots being closed at the periphery of the stator by said shell, a ball bearing assembly at each end of said shell, each ball bearing assembly comprising an outer race engaging one end of the shell, a plurality of spaced balls located in an inner continuous groove in each outer race, and an inner race at each end of the assembly, and each inner race having an outer continuous groove engaging the spaced balls of its ball bearing assembly, a cylindrical shaft having an annular shoulder at one end and a threaded portion at its other end, a rotor having a through bore fitting on said shaft, and comprising a cylindrical body with a tubular spacer sleeve at each end, said spacer sleeves each engaging the end of one of said inner races and a threaded member carried by said threaded portion of said shaft and clamping said inner races against the tubular spacers and against the annular shoulder at the end of the shaft, forming a unitary assembly, said rotor having a clearance between its spacer sleeve and the stator bore and between one end of the stator cylindrical body and the adjacent end of the cylindrical rotor body, permitting leakage of air through said clearances and through the spaces between the balls of the bearing at that end of the shell, said rotor having a plurality of curved concentric walled slots in its periphery, forming curved vanes located in close proximity to but having a clearance with respect to the bore in said shell, said air nozzles directing air peripherally and axially into said rotor slots in the direction of rotation of the rotor, which discharges the air downwardly from the rotor into an exhaust chamber communicating with said outlet port and with the spaces between the balls of the adjacent ball bearing assembly, for cooling the ball bearings and producing air flow out of the end of the assembly to exclude dirt by outward flow.

2. An air driven dental handpiece, comprising a light, thin-walled cylindrical shell having a cylindrical bore extending therethrough, said wall having axially spaced lateral inlet and lateral outlet ports, a driven shaft having an enlargement extending from one end to an annular shoulder, and having a threaded portion at its other end, a threaded member engaging said threaded portion, a rotor having a cylindrical body portion and an axial bore receiving and fitting on said shaft, and having an integral spacer tube at each end of said cylindrical body portion, two anti-friction bearings mounted on the ends of said shaft, each such anti-friction bearing including an inner race, an outer race and rolling elements, one of said inner races being confined between said annular shoulder and the end of one spacer tube on said rotor, and the other inner race being confined between the end of the other spacer tube on said rotor and said threaded member, a stator having a plurality of axially and peripherally directed stator slots cut in its periphery and forming fluid nozzles between the stator and the shell, and said rotor having in its periphery a plurality of transverse slots curved to receive fluid from said nozzles at one end of the rotor and to discharge it downwardly with respect to the direction of rotation of the rotor at the other end of the rotor, said stator and shell engaging the inner ends of outer races of said antifriction bearings and forming a unitary assembly.

3. An air driven dental handpiece assembly, comprising a tubular shaft, having a cylindrical bore extending through said shaft, said shaft having an external cylindrical body, extending from its upper end to an annular shoulder adjacent its lower end, an integral frusto-conical enlargement at the lower end of said shaft and extending from said annular shoulder to the end of said shaft, said shaft having a threaded bore at its upper end, a rotor comprising a cylindrical enlargement having slots forming blades, having a cylindrical bore fitting on said shaft and having an integral cylindrical tubular extension axially located and carried above and another cylindrical tubular extension axially located and carried below said cylindrical enlargement, a lower bearing member located on the lower end of said shaft and confined between said annular shoulder and the end of said lower tubular extension of said rotor, an upper bearing member located on the upper end of said shaft and engaging the upper end of said upper extension and an externally threaded bearing retainer threaded into the upper end of said tubular shaft and having a radially extending head with a lower annular surface engaging and confining said upper bearing on said shaft.

4. An air driven dental handpiece assembly, comprising a tubular metal spacer member having an inner and an outer cylindrical surface and a lower inwardly extending flange and plane surfaces on the upper and lower ends of said spacer, a tubular shaft having internal threads in its upper end and an annular shoulder on its lower end, a lower unitary ball bearing assembly comprising an inner race on said shaft, spaced balls and an outer race engaging the end of said spacer, a turbine rotor having upper and lower spacing tubes on said shaft, a turbine stator surrounding the upper spacing tube and having an annular inlet manifold, said annular air inlet manifold leading to nozzle openings extending axially toward the rotor, which has adjacent axial through openings forming blades, a unitary upper ball bearing assembly comprising an outer race engaged in a cylindrical bore in the stator, spaced balls and an inner race mounted on said shaft and engaged by the rotor upper spacing tube and a threaded member in the end of the shaft.

References Cited by the Examiner

UNITED STATES PATENTS

| | | | |
|---|---|---|---|
| 2,180,993 | 11/1939 | Monnier. | |
| 2,808,225 | 10/1957 | Johnson | 253—3 |
| 2,868,584 | 1/1959 | Faust | 299—86 |
| 2,897,596 | 8/1959 | Maurer. | |
| 2,928,174 | 3/1960 | White | 32—27 |
| 2,945,299 | 7/1960 | Fritz | 32—27 |
| 3,001,288 | 9/1961 | Freedman | 32—69 |
| 3,078,576 | 2/1963 | Hoffmeister et al. | 32—27 |
| 3,132,426 | 5/1964 | White | 32—27 |

FOREIGN PATENTS 560,417  9/1957  Belgium.

RICHARD A. GAUDET, Primary Examiner.

FOREIGN PATENTS

ROBERT E. MORGAN, Examiner.